United States Patent Office 3,264,370
Patented August 2, 1966

3,264,370
STOVING FINISHES CONTAINING AN ALKYLOLATED ACRYLAMIDE INTERPOLYMER WITH A POLYEPOXIDE ETHERIFIED WITH PHENOL AND ESTERIFIED WITH A MONOCARBOXYLIC ACID
Gustav Ott, Arlesheim, Hans Gempeler, Muttenz, and Eduard Knecht, Basel, Switzerland, assignors to Ciba Limited, Basel, Switzerland, a Swiss company
No Drawing. Filed Mar. 13, 1963, Ser. No. 264,757
Claims priority, application Switzerland, May 7, 1962, 5,454/62
3 Claims. (Cl. 260—834)

The present invention provides stoving coating compositions comprising (a) polymers or copolymers of acrylamide or methacrylamide, in which amido hydrogen atoms are replaced by the structure —$CH_2$—O—$R_1$, where $R_1$ is a hydrogen atom or a lower alkyl group with 1 to 4 carbon atoms, and (b) 5 to 40, preferably 10 to 20% by weight (calculated from the total weight of the resinous portion of the lacquer composition) of a polyether-ester containing hydroxyl groups obtained by partially etherifying, in a 1:2-epoxy compound having an epoxide equivalence greater than 1, the 1:2-epoxide groups with a monophenol in a first stage, and by esterifying in the obtained reaction product the residual 1:2-epoxy groups with a monocarboxylic acid in a second stage.

The methylolated and/or alkoxymethylated polymers or copolymers of acrylamide contained in the stoving finishes have been described in detail in U.S. specification No. 2,870,116. Preferred use is made of those methylolated copolymers which are composed of about 5 to 45% by weight of monomeric units of acrylamide or methacrylamide and about 95 to 55% by weight of monomeric units of one or more than one other copolymerizable monomer. For this purpose preference is given to such other copolymerizable monomers as contain a single grouping $CH_2$=C<, such as methylacrylate, ethylacrylate, butylacrylate, styrene, vinyltoluene, acrylic acid or monomethylstyrene. The copolymerization is performed in known manner, preferably in the presence of a solvent, such as butanol, isopropanol or ethyleneglycol monobutyl ether, and in the presence of conventional polymerization catalysts, such as organic peroxides. For the subsequent methylolation of the acrylamide polymers it is of advantage to use 2 molecular proportions of formaldehyde for every equivalent of amide groups present in the polymer or copolymer. Formaldehyde may be used in the form of a solution thereof in water or in a lower alcohol, such as butanol, or in the form of an oligomer or polymer thereof, such as trioxymethylene or paraformaldehyde. The methylolation is advantageously performed in the presence of an acidic catalyst, such as mineral acid, or oxalic acid, or preferably in the presence of maleic anhydride.

The polyether-esters contained in the stoving finishes are either solid, fusible resins or are liquid to highly viscous at room temperature.

The 1:2-epoxide compounds having an epoxide equivalence greater than 1, which are used as starting materials for making these polyether-esters are compounds containing $x$ groups of the formula

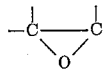

calculated from the mean molecular weight, $x$ being a whole or fractional number greater than 1.

The 1:2-epoxide groups may be terminal or inner ones. Particularly suitable terminal 1:2-epoxide groups are 1:2-epoxyethyl or 1:2-epoxypropyl groups; preferably, they are 1:2-epoxypropyl groups linked with an oxygen atom, that is to say glycidyl ether or glycidyl ester groups. Compounds containing inner epoxide groups contain at least one 1:2-epoxide group in an aliphatic chain

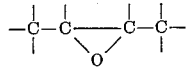

or attached to a cycloaliphatic ring.

Suitable polyglycidyl ethers are the known compounds obtained by alkaline condensation of epichlorohydrin with polyhydroxy compounds. Suitable polyhydroxy compounds are polyalcohols, such as ethyleneglycol, propyleneglycol, 1:4-butanediol, diethyleneglycol, triethyleneglycol, 2:3-dichloro-1:4-butanediol, 2:2:3:3-tetrachloro-1:4-butanediol, glycerol or hexanetriol, and more especially polyphenols, such as phenol novolaks or cresol novolaks, resorcinol, pyrocatechol, hydroquinone, 1:4-dihydroxynaphthalene, bis-(4-hydroxyphenyl)-methylphenylmethane, bis-[4-hydroxyphenyl]-tolylmethane, 4:4′-dihydroxydiphenyl, bis-[4-hydroxyphenyl]-sulfone, chlorinated bisphenols, and more especially bis-[4-hydroxyphenyl]-dimethylmethane (bisphenol A).

Polyglycidyl ethers that are particularly suitable starting materials for use in the present process correspond to the average formula

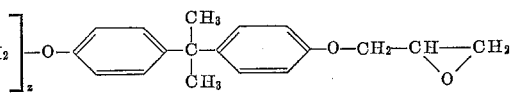

where $z$ is a whole number from 0 to 6. When $z=0$, there is obtained the diglycidyl ether of bisphenol A, which is liquid at room temperature, and contains about 4.8 to 5.6 epoxide equivalents per kg. Preference is given to higher polyglycidyl ethers containing about 0.5 to 3.5 epoxide equivalents per kg., for example those in which $z=2, 3, 4, 5$ or 6. As a rule, these compounds are solid at room temperature.

Furthermore, there are suitable polyglycidyl esters such as are obtained by reacting a dicarboxylic acid with epichlorohydrin or dichlorohydrin in the presence of alkali. Such polyesters may be derived from an aliphatic dicarboxylic acid such as oxalic, succinic, glutaric, adipic, pimelic, suberic, azelaic, sebacic acid or more especially from an aromatic dicarboxylic acid such as phthalic, isophthalic, diphenyl-ortho:ortho′-dicarboxylic acid, ethyleneglycol-bis-(para-carboxy-phenyl)-ether or the like. As examples there may be mentioned diglycidyl adipate and diglycidyl phthalate and diglycidyl esters corresponding to the average formula

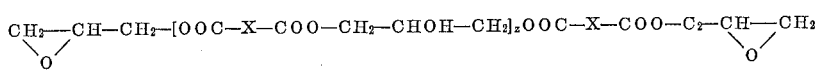

in which X represents a phenylene group and $z$ is a small whole or fractional number.

Further suitable are basic polyepoxy compounds such as are obtained by reacting primary or secondary aliphatic or aromatic diamines, such as aniline, toluidine, 4:4′-diaminodiphenylmethane, 4:4′-di-(monomethylamino)-diphenylmethane or 4:4′-diaminodiphenylsulfone with epichlorohydrin in the presence of alkali.

As epoxy compounds with an inner 1:2-epoxide group there are suitable expoxidized diolefines, dienes or cyclic dienes, such as 1:2:5:6-diepoxyhexane, 1:2:4:5-diepoxycyclohexane, dicyclopentadiene diepoxide, dipentene diepoxide and more especially vinylcyclohexene diepoxide; epoxidized, diolefinically unsaturated carboxylic acid esters, such as methyl-9:10:12:13-diepoxy stearate and the dimethyl ester of 6:7:10:11-diepoxyhexadecane-1:16-dicarboxylic acid. Furthermore, there may be mentioned epoxidized mono-, di- or polyethers, mono-, di- or polyacetals, containing at least one five-membered or six-membered cycloaliphatic ring to which at least one 1:2-epoxide group is linked. As such compounds there are suitable those of the following formulae:

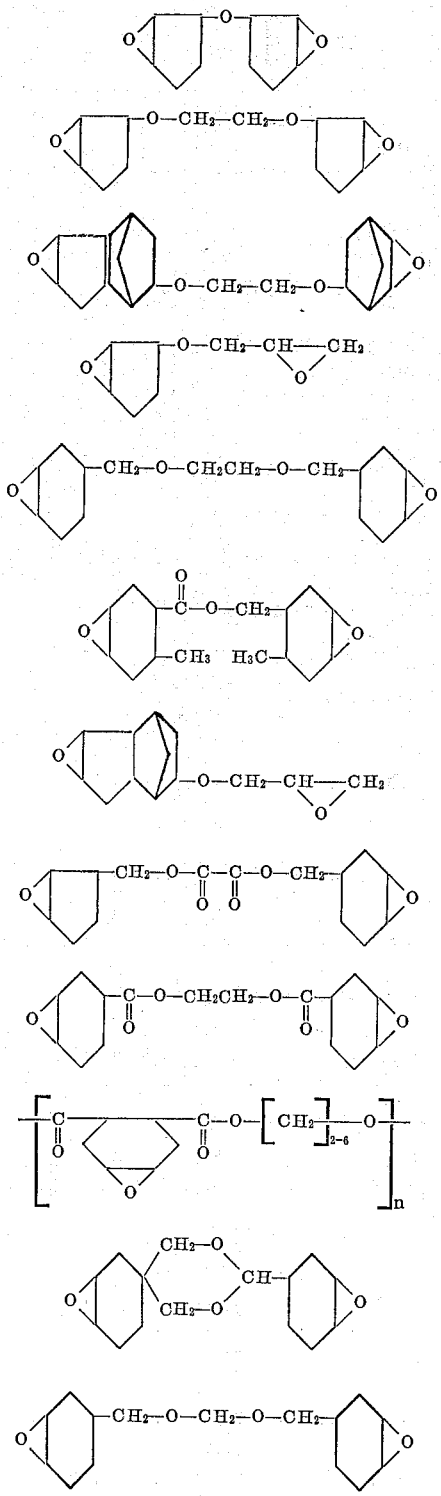

As further compounds containing an inner 1:2-epoxide group there may be mentioned epoxidized diolefine polymers, more especially polymers of butadiene or cyclopentadiene and epoxidized vegetable or animal fats or oils. Preferred polymers of butadiene are the epoxidized copolymers or adducts with styrene, acrylonitrile, toluene or xylene.

Finally, there are suitable telomers containing epoxide groups, such as are obtained by telomerization of ethylenically unsaturated monoepoxides of the aliphatic or cycloaliphatic series, such as allyl glycidyl ether, allylphenyl glycidyl ether, 3:4-epoxy-tetrahydrodicyclopentadienyl-8-allyl ether or 3-vinyl-2:4-dioxospiro(5:5)-9:10-epoxy-undecane with telogens, such as carbon tetrachloride, dimethyl phosphite or cyclohexanone in the presence of an organic peroxide.

The reaction of the 1:2-epoxy compound with a monophenol is advantageously performed by simply heating the reactants, for example at a temperature from 100 to 200° C., in the presence of an organic base or of an alkali, such as an alcoholic potassium hydroxide solution. In this operation as a rule the major proportion of the 1:2-epoxide groups react with the phenolic hydroxyl groups according to the reaction scheme:

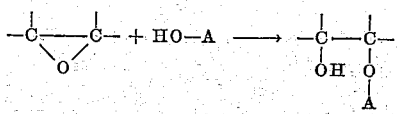

where A stands for an unsubstituted or substituted aromatic hydrocarbon radical.

As monophenols suitable for reaction with the 1:2-epoxy compounds there may be mentioned: Phenol, ortho-, meta- and para-cresol, 2:3-xylenol, 2:5-xylenol, 3:4-xylenol, guaiacol, α-naphthol, β-naphthol, ortho-, meta- and para-chlorophenol, dichlorophenol, para-tertiary butylphenol, para-tertiary octylphenol and para-nonylphenol.

In the intermediately formed polyethers which still contain residual 1:2-epoxy groups the latter are then esterified with a monocarboxylic acid, the reactants being advantageously heated in the presence of a base, such as a tertiary amine, at a temperature of 100 to 200° C.

Monocarboxylic acids, to be reacted in a second stage with the polyethers containing hydroxyl groups formed in the first stage, are those of the aliphatic, cycloaliphatic, araliphatic or aromatic series.

As aliphatic monocarboxylic acids there may be mentioned, for example, formic, acetic, propionic, butyric, valeric oenanthic, caproic, caprylic, capric, lauric, myristic, palmitic, stearic crotonic, oleic, linoleic, linolenic, lactic and ricinolic acid.

Suitable monocarboxylic acids of the cycloaliphatic series are, for example, $\Delta^3$-tetrahydrobenzoic, 6-methyl-$\Delta^3$-tetrahydrobenzoic, abietic and hydrogenated abietic acid.

As examples of monocarboxylic acids of the araliphatic and aromatic series there may be mentioned phenylacetic, benzoic, naphthoic and salicylic acid.

The stoving compositions of the invention further contain conventional additives, more especially an organic diluent and solvent such as butanol, xylene, pine oil, methylisobutyl ketone or cyclohexanone, pigments such as titanium dioxide or lampblack, and if desired also an acidic catalyst such as citric, tartaric or phosphoric acid, also plasticisers, fillers, a flow control agent such as silicone oil, germ killers, flame-inhibitors and the like.

The stoving finishes of the invention are suitable for producing coats on a wide variety of substrata, and are preferentially used, for example, in motorcar bodies, refrigerators, air conditioning plants, heating installations, washing installations etc.

In the following examples parts and percentages are by weight, the relationship between part by weight and part by volume being the same as between the kilogram and the liter.

Example 1

250 parts of an epoxy resin which is solid at room temperature, contains 2.0 epoxide equivalents per kg., and has been obtained in known manner by reacting bis(4-hydroxyphenyl)-dimethylmethane with epichlorohydrin in the presence of alkali, are mixed with 135 parts of para-tertiary octylphenol and heated under nitrogen to 160° C. When this temperature has been reached, 1 part by volume of 0.1 N-alcoholic potassium hydroxide solution is added, and the temperature is maintained for 1 hour at 160° C. 92 parts of benzoic acid and 0.2 part by volume of benzyl-dimethylamine are then added and the temperature is further maintained for 2 hours at 160° C. The reaction product thus obtained is a still slightly tacky, yellow-brown resin which is solid at room temperature, contains only 0.03 epoxide equivalent per kg. and has a hydroxyl number of 175 and an acid number of 21.5.

The above resin is made up into a stoving finish in conjunction with the acrylic resin solution A described below in the following manner:

A clear coating composition of 50% solids content is prepared from 170 parts of acrylic resin solution A, 15 parts of the polyether resin described above and 15 parts of a solvent mixture consisting of 6 parts of xylene, 3 parts of butanol and 1 part of cyclohexanone.

120 parts of the clear coating composition of 50% solids content are ground with 40 parts of titanium dioxide and the resulting paste is diluted to a spray consistency with the afore-mentioned solvent mixture. When applied with the aid of a spraygun and then stoved for 30 minutes at 180° C., it forms both on sheet iron and sheet aluminum a very hard, very brilliant coat free from pin holes and which has an Erichsen distensibility value of 6 mm. and a reverse impact resistance in excess of 320 cm. for a weight of 500 g.

The acrylic resin solution A is prepared as follows:

A mixture of 300 parts of styrene, 210 parts of n-butylacrylate, 90 parts of acrylamide, 580 parts of n-butanol, 6 parts of dodecylmercaptan and 6 parts of cumene hydroperoxide (70%) is heated at 120°. After 2 hours 6 parts of cumene hydroperoxide (70%) in 10 parts of butanol are added, and the batch is refluxed for 2 hours. Another solution of 6 parts of cumene hydroperoxide in 10 parts of butanol is then added, and the whole is heated on for 2 hours at 120° C., whereupon 192 parts of a solution of 40% strength of formaldehyde in butanol and 2 parts of maleic anhydride are added and refluxing is continued for 3 hours. About 450 parts of butanol are then distilled off and replaced by 300 parts of xylene, to yield a clear, faintly yellowish resin solution of about 50% solids content, having a viscosity of about 4000 centipoises at 20° C. and an acid number of 4.6 (calculated for 100% resin).

Example 2

A mixture of 250 parts of the epoxy resin used in Example 1, containing 2.0 epoxide equivalents per kg., and 95 parts of para-tertiary butylphenol is heated to 160° C., whereupon 1 part by volume of 0.1 N-alcoholic potassium hydroxide solution is added. The temperature is maintained for 1 hour at 160° C. and then 20 parts of benzoic acid are added. The batch is heated for another 2 hours at 160° C. In this manner a viscid resin is obtained which is substantially free from epoxide groups and has an acid number of 13.4 and a hydroxyl number of 214.

A stoving system is prepared from the above resin with the acrylic resin solution B described below in the following manner:

A clear coating composition having a solids content of 50% is formed by mixing 170 parts of acrylic resin solution B with 15 parts of the hydroxylated polyether resin and 15 parts of a solvent mixture of 6 parts of xylene, 3 parts of butanol and 1 part of cyclohexanone. When the resulting clear coating composition is applied with a spraygun to sheet iron and stoved for 30 minutes at 180° C., a hard coat free from surface defects having good mechanical film properties and good resistance to solvents is obtained.

The acrylic resin solution B is prepared thus:

A mixture of 360 parts of styrene, 105 parts of 2-ethylhexyl acrylate, 75 parts of acrylamide, 60 parts of methylacrylate, 580 parts of butanol, 6 parts of cumene hydroperoxide (70%) and 6 parts of dodecylmercaptan is refluxed for 2 hours, 6 parts of cumene hydroperoxide (70%) in 10 parts of butanol are then added, and the batch is heated for another 2 hours at 120° C., whereupon another 6 parts of cumene hydroperoxide in 10 parts of butanol are added and the mixture is refluxed for another 2 hours. After this time 200 parts of a 40% solution of formaldehyde in butanol and 2 parts of maleic anhydride are added, and the whole is heated on for 3 hours at 120° C. Approximately 390 parts of butanol are then distilled off and replaced by 325 parts of xylene, to yield a clear, faintly yellowish resin solution of about 50% solids content having an acid number of 2.4 (calculated for 100% resin).

Example 3

A mixture of 250 parts of the epoxy resin used in Example 1 containing 2.0 epoxide equivalents per kg., and 139 parts of para-nonylphenol is heated in a current of nitrogen to 160° C., whereupon 1 part by volume of 0.1 N-alcoholic potassium hydroxide solution is added. The batch is heated for 1 hour at 160° C. and 22 parts of benzoic acid are then added, and the reaction mixture is maintained for another 2 hours at 160° C., to yield a yellowish brown, viscid resin which contains 0.08 epoxide equivalent per kg. and has an acid number of 9 and a hydroxyl number of 185.

A spray coating composition is prepared by mixing 15 parts of the above resin with 170 parts of the acrylic resin solution A described in Example 1 and this mixture is diluted with a solvent mixture of 6 parts of xylene, 3 parts of butanol and 1 part of cyclohexanone. When applied with the aid of a spraygun to sheet iron and stoved for 30 minutes at 180° C., a hard coat free from surface defects is obtained.

Example 4

A mixture of 250 parts of the epoxy resin used in Example 1 containing 2.0 epoxide equivalents per kg., and 130 parts of para-tertiary octylphenol is heated under nitrogen to 160° C. When this temperature has been reached, 1 part by volume of 0.1 N-alcoholic potassium hydroxide solution is added. The whole is heated for 1 hour at 160° C.; then 15 parts of crotonic acid are added, and the batch is heated on for 3 hours at 160° C. The reaction product thus obtained is a yellowish brown resin which is practically solid at room temperature, is substantially free from epoxide groups and has an acid number of 10 and a hydroxyl number of 181.

A clear coating composition is prepared from 150 parts of the acrylic resin solution A described in Example 1, 25 parts of the hydroxylated polyether resin described above and 25 parts of a solvent mixture consisting of 6 parts of xylene, 3 parts of butanol and 1 part of cyclohexanone. When this finish is diluted to spray consistency and applied with the aid of a spraygun to sheet iron and stoved for 30 minutes at 180° C., it forms a very hard, flexible coat having a pendulum hardness according to Persoz of 351 seconds and an Erichsen distensibility value of 9 mm.

Example 5

A mixture of 250 parts of the epoxy resin used in Example 1 and 139 parts of para-nonylphenol is heated under nitrogen to 160° C., and 1 part by volume of 0.1 N-alcoholic potassium hydroxide solution is then added. The mixture is heated for 1 hour at 160° C.; 15 parts of crotonic acid and 0.1 part by volume of benzyldimethylamine are added, whereupon the batch is heated for another 3 hours at 160° C., to yield a viscid brown resin which is almost solid at room temperature, is substantially free from epoxide groups and has an acid number of 8.6 and a hydroxyl number of 180.

A clear coating composition of 50% solids content is prepared from 150 parts of the acrylic resin solution A described in Example 1, 25 parts of the hydroxylated polyether resin described above and 25 parts of the hydroxylated polyether resin described above and 25 parts of a solvent mixture consisting of 6 parts of xylene, 3 parts of butanol and 1 part of cyclohexanone. When this clear coating composition is diluted to spray consistency and applied with the aid of a spray-gun to sheet iron and stoved for 30 minutes at 180° C., it forms a very hard coat free from defects, which displays good resistance to boiling water detergents.

*Example 6*

A mixture of 250 parts of the epoxy resin used in Example 1 (containing 2.0 epoxide equivalents per kg.) and 135 parts of para-tertiary octylphenol is heated to 160° C., whereupon 1 part by volume of 0.1 N-alcoholic potassium hydroxide solution is added. The batch is then heated for 1 hour at 160° C.; 80 parts of glacial acetic acid and 0.2 part by volume of benzyldimethylamine are then added, and the whole is refluxed until the epoxide equivalence has dropped below 0.1 per kg. 25 parts of benzoic acid are then added, and the batch is heated for a short time at 160° C., to yield a solid, slightly tacky, yellowish brown resin which contains 0.01 epoxide equivalent per kg. and has an acid number of 28.5 and a hydroxyl number of 140.

A clear coating composition of 50% solids content is prepared from 15 parts of the above hydroxylated polyether resin, 170 parts of the acrylic resin solution A described in Example 1, and 15 parts of a solvent mixture consisting of 6 parts of xylene, 3 parts of butanol and 1 part of cyclohexanone.

120 parts of the above clear coating composition of 50% solids content are ground with 40 parts of titanium dioxide (rutile) and 0.02 part of silicone oil "SF–69" (registered trademark of General Electric). The resulting paste is adjusted to spray viscosity with the same solvent mixture as used above for the preparation of the clear lacquer. When the resulting pigmented coating composition is applied with the aid of a spray gun to sheet iron of aluminum it forms after stoving for 30 minutes at 180° C. a very hard, very shiny coat which is free from surface defects and has an Erichsen indentation value of 7 mm.

*Example 7*

A mixture of 250 parts of the epoxy resin used in Example 1 (containing 2.0 epoxide equivalents per kg.) and 135 parts of para-tertiary octylphenol is heated in a current of nitrogen to 160° C., whereupon 1 part by volume of 0.1 N-alcoholic potassium hydroxide solution is added. After 1 hour a mixture of 45 parts of lauric acid and 0.2 part by volume of benzyldimethylamine is added, and the batch is heated for 2 hours at 160° C. (by which time the acid number has dropped to 0) and 23 parts of benzoic acid are added. The batch is heated for 1 hour longer at 160° C., to yield a viscid resin which contains 0.07 epoxide equivalent per kg. and has an acid number of 18.1 and a hydroxyl number of 170.

A clear coating composition is prepared by mixing 160 parts of the acrylic resin solution B described in Example 2 and 53 parts of the hydroxylated polyether resin described above. When this clear coating composition is applied with a spray gun to sheet aluminum and stoved for 30 minutes at 180° C. a coat is obtained which is free from defects and is very resistant towards boiling water.

*Example 8*

A mixture of 250 parts of the epoxy resin used in Example 1 (containing 2.0 epoxide equivalents per kg.) and 135 parts of para-tertiary octylphenol is heated under nitrogen to 160° C. When this temperature has been reached, 0.2 part by volume of benzyldimethylamine is added and the mixture is heated for 1 hour at 160° C., whereupon 127 parts of hydrogenated rosin and 0.1 part by volume of benzyldimethylamine are added; the reaction mixture is heated for 2 hours at 160° C., to yield a hard, light-yellow resin which contains 0.03 epoxide equivalent per kg. and has an acid number of 17 and a hydroxyl number of 162.

A clear coating composition having a solids content of 50% is prepared from 15 parts of the above hydroxylated poly-ether resin, 170 parts of the acrylic resin solution B described in Example 1 and 15 parts of a solvent mixture consisting of 6 parts of xylene, 3 parts of butanol and 1 part of cyclohexanone.

A pigmented spray coating composition is prepared from the above clear mixture, as described in Example 6. When it is sprayed on sheet iron or aluminum and stoved for 30 minutes at 180° C., it forms a very hard, high-gloss coat having an Erichsen indentation value of about 6 mm.

*Example 9*

A mixture of 250 parts of the epoxy resin used in Example 1 (containing 2.0 epoxide equivalents per kg.) and 80 parts of phenol is heated under nitrogen to 160° C. When this temperature has been reached, 1 part by volume of 0.1 N-alcoholic potassium hydroxide solution is added and 1 hour later 36 parts of benzoic acid are added. The batch is then heated for 2 hours at 160° C., to yield a still slightly tacky, yellowish brown resin which is hard at room temperature, contains 0.023 epoxide equivalent per kg. and has an acid number of 22.3 and a hydroxyl number of 198.

A clear coating composition is prepared from 160 parts of the acrylic resin solution B described in Example 2 and 20 parts of the above hydroxylated polyether resin, diluted with a solvent mixture consisting of 6 parts of xylene, 3 parts of butanol and 1 part of cyclohexanone to form a spray coating composition and sprayed with a spraygun. It forms a hard, flexible coat which has a pendulum hardness according to Persoz of 337 seconds and good stability towards solvents.

*Example 10*

A mixture of 250 parts of the epoxy resin used in Example 1 (containing 2.0 epoxide equivalents per kg.) and 92 parts of para-cresol is heated under nitrogen to 160° C., whereupon 1 part by volume of 0.1 N-alcoholic potassium hydroxide solution is added. After 1 hour 36 parts of benzoic acid and 0.2 part by volume of benzyldimethylamine are added, and the mixture is heated for another 2 hours at 160° C., to yield a yellowish resin which is hard at room temperature, contains 0.02 epoxide equivalent per kg. and has an acid number of 23 and a hydroxyl number of 195.

A clear coating composition of 50% solids content is prepared from 15 parts of the above hydroxylated polyether resin, 170 parts of the acrylic resin solution a described in Example 1, and 15 parts of a solvent mixture consisting of 6 parts of xylene, 3 parts of butanol and 1 part of cyclohexanone.

From this a pigmented spray coating is prepared as described in Example 6. When it is sprayed with a spray-gun on sheet aluminum and then stoved for 30 minutes at 180° C., it forms a hard lacquer coat of good lustre which is free from pin holes.

Example 11

A mixture of 100 parts of 3:4-epoxy-hexahydrobenzal-3':4' - epoxy-1':1'-bis(hydroxymethyl)-cyclohexane and 171 parts of para-tertiary octylphenol is heated under nitrogen to 160° C.; 1 part by volume of 0.1 N-alcoholic potassium hydroxide solution is then added and the batch is heated for 1 hour at 160° C. 59 parts of benzoic acid and 0.2 part by volume of benzyldimethylamine are then added. The reaction mixture is heated for 2 hours longer at 160° C., to yield a tacky, yellowish brown resin which is solid at room temperature, contains 0.08 epoxide equivalent per kg. and has an acid number of 31.5 and a hydroxyl number of 179.

A clear finish of 50% solids content is prepared from 15 parts of the above hydroxylated polyether resin, 170 parts of the acrylic resin solution A described in Example 1, and 15 parts of a solvent mixture consisting of 6 parts of xylene, 3 parts of butanol and 1 part of cyclohexanone.

A pigmented spray lacquer is prepared from the above clear finish as described in Example 6; when it is sprayed on sheet aluminum and stoved for 30 minutes at 180° C., it forms a coat which is free from surface defects and has a good gloss.

Example 12

A mixture of 160 parts of para-tertiary octylphenol and 100 parts of a polyepoxide containing 5.4 epoxide equivalents per kg. (obtained by adding about 4 mols of butadiene on to 1 mol of toluene in the present of a potassium+sodium alloy, followed by epoxidation of the tetrabutenylated toluene with peracetic acid) is heated under nitrogen to 160° C. 1 part by volume of 0.1 N-alcoholic potassium hydroxide solution is then added, and the batch is heated for 2 hours at 160° C. A mixture of 30 parts of benzoic acid and 0.2 part by volume of benzyldimethylamine is then added and the mixture is heated for another 2 hours at 160° C., to yield a highly viscous, viscid, golden brown resin which contains 0.1 epoxide equivalent per kg. and has an acid number of 27 and a hydroxyl number of 151.

A pigmented spray coating composition is prepared from the above polyether resin as described in Example 11. When it is applied with the aid of a spraygun to sheet steel and stoved for 30 minutes at 180° C., it forms a hard coat which is free from surface defects and has an Erichsen indentation value of 7.2 mm.

Example 13

A mixture of 100 parts of butanediol-1:4-diglycidyl ether (containing 7.53 epoxide equivalents per kg.) and 100 parts of para-tertiary octylphenol is heated under nitrogen to 160° C., whereupon 1 part by volume of 0.1 N-alcoholic potassium hydroxide solution is added, and the whole is heated for 1 hour at 160° C. 69 parts of benzoic acid and 0.2 part by volume of benzyldimethylamine are then added and the batch is heated on for 2 hours at 160° C., to yield a faintly yellowish resin which is liquid at room temperature, contains 0.03 epoxide equivalent per kg. and has an acid number of 18.6 and a hydroxyl number of 194.

A pigmented spray lacquer is prepared from this polyether resin as described in Example 11. When it is applied by spraying to sheet aluminum and stoved on it for 30 minutes at 180° C., it forms a hard coat free from defects which has a pendulum hardness according to Persoz of 303 seconds and an indentation value according to Erichsen of 6.6 mm.

Example 14

A mixture of 80 parts of the hydroxylated polyether resin described in Example 1, and 27 parts of a butanolic solution of 75% strength of a dimethylolurea etherified with butanol is made into a clear coating composition which is diluted with a solvent mixture consisting of 8 parts of xylene, 1 part of ethyl acetate and 1 part of cyclohexanone to form a spray lacquer. When it is sprayed on sheet iron and stoved on it for 30 minutes at 150° C., it forms a very hard coat which is free from surface defects and has a pendulum hardness according to Persoz of 383 seconds.

Example 15

40 parts of the hydroxylated polyether resin described in Example 1 are mixed with 80 parts of a butanolic solution of 75% strength of a hexamethylolmelamine etherified with butanol to form a clear solution which is diluted to spray consistency with a solvent mixture consisting of 8 parts of xylene, 1 part of ethyl acetate and 1 part of cyclohexanone. When this coating composition is applied with a spraygun to sheet iron and stoved for 30 minutes at 150° C., it forms a very hard coat free from defects which has a pendulum hardness according to Persoz of 378 seconds.

What is claimed is:

1. A stoving coating composition comprising
   (a) an interpolymer of a member selected from the class consisting of acrylamide and methacrylamide with at least one other monomer having a $CH_2\!\!=\!\!C\!<$ group, said interpolymer having amido hydrogen atoms replaced by the structure $$-CH_2O-R_1$$

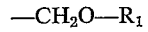

wherein $R_1$ is a member of the class consisting of hydrogen and lower alkyl with 1 to 4 carbon atoms, and
   (b) 5 to 40% by weight calculated on the total weight of the resinous portion of the coating composition of a polyether-ester which is obtained by partially etherifying, in a 1:2-epoxy compound having a 1:2-epoxy equivalency greater than 1, the 1:2-epoxide groups with a monophenol in a first stage, and by esterifying in the obtained reaction product the residual 1:2-epoxy groups with a monocarboxylic acid in a second stage.

2. A stoving coating composition comprising
   (a) an interpolymer of a member selected from the class consisting of acrylamide and methacrylamide with at least one other monomer having a $CH_2\!\!=\!\!C\!<$ group, said interpolymer having amido hydrogen atoms replaced by the structure $$-CH_2O-R_1$$

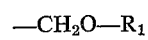

wherein $R_1$ is a member of the class consisting of hydrogen and lower alkyl with 1 to 4 carbon atoms, and
   (b) 10 to 20% by weight calculated on the total weight of the resinous portion of the coating composition of a polyether-ester which is obtained by partially etherifying in a 1:2-epoxy compound having a 1:2-epoxy equivalency greater than 1 the 1:2-epoxide groups with a monophenol in a first stage, and by esterifying in the obtained reaction product the residual 1:2-epoxy groups with a monocarboxylic acid in a second stage.

3. A stoving coating composition comprising
   (a) an interpolymer of a member selected from the class consisting of acrylamide and methacrylamide with at least one other monomer having a $CH_2\!\!=\!\!C\!<$ group, said interpolymer having amido hydrogen atoms replaced by the structure $$-CH_2O-R_1$$

wherein $R_1$ is a member of the class consisting of hydrogen and lower alkyl with 1 to 4 carbon atoms, and
   (b) 5 to 40% by weight calculated on the total weight of the resinous portion of the coating composition of a polyether-ester which is obtained by partially etherifying in a polyglycidyl ether obtained by condensing epichlorohydrin with bis(4-hydroxyphenyl)-dimethylmethane the 1:2-epoxide groups with a monophenol selected from the class consisting of para-tertiary-butylphenol, para-octylphenol and para-nonylphenol in a first stage, and by esterifying in the obtained reaction product the residual 1:2-epoxy groups with benzoic acid in a second stage.

References Cited by the Examiner

UNITED STATES PATENTS

| | | | |
|---|---|---|---|
| 2,870,116 | 1/1959 | Vogel | 260—853 |
| 3,222,418 | 12/1965 | Murdock | 260—837 |

SAMUEL H. BLECH, *Primary Examiner.*

P. LIEBERMAN, *Assistant Examiner.*